(12) United States Patent (10) Patent No.: US 9,156,933 B2
Gudipati et al. (45) Date of Patent: Oct. 13, 2015

(54) CATION EXCHANGE MATERIALS PREPARED IN AQUEOUS MEDIA

(75) Inventors: Chakravarthy S. Gudipati, Singapore (SG); Russell James MacDonald, Wilmington, MA (US)

(73) Assignee: General Electric Company, Schenectady, NY (US)

( * ) Notice: Subject to any disclaimer, the term of this patent is extended or adjusted under 35 U.S.C. 154(b) by 276 days.

(21) Appl. No.: 13/231,428

(22) Filed: Sep. 13, 2011

(65) Prior Publication Data

US 2013/0064982 A1 Mar. 14, 2013

(51) Int. Cl.
  *C08F 222/24* (2006.01)
  *B01J 39/20* (2006.01)
  *B01J 39/18* (2006.01)
  (Continued)

(52) U.S. Cl.
  CPC .............. *C08F 220/58* (2013.01); *B01J 39/18* (2013.01); *B01J 39/185* (2013.01); *B01J 39/20* (2013.01); *B01J 47/12* (2013.01); *C08J 5/2206* (2013.01); *C08J 5/2231* (2013.01); *C08F 220/26* (2013.01); *C08F 220/38* (2013.01); *C08F 222/24* (2013.01); *C08F 228/02* (2013.01); *C08F 2220/382* (2013.01); *C08F 2220/385* (2013.01); *C08F 2220/387* (2013.01); *C08J 5/22* (2013.01); *C08J 2333/14* (2013.01)

(58) Field of Classification Search
  CPC ......... B01J 39/18; B01J 39/20; B01J 39/185; B01J 47/12; C08J 5/22; C08J 5/2231; C08F 220/58; C08F 220/26; C08F 220/38; C08F 2220/382; C08F 2220/385; C08F 2220/387; C08F 222/24; C08F 228/02

USPC ........................................................ 526/287
  See application file for complete search history.

(56) References Cited

U.S. PATENT DOCUMENTS 3,647,086 A 3/1972 Mizutani et al.
4,110,265 A 8/1978 Hodgdon
(Continued)

FOREIGN PATENT DOCUMENTS

FR 2950060 A1 3/2011
JP 06200224 A * 7/1994
(Continued)

OTHER PUBLICATIONS

Khan , Ak et al, "Effect of thermal and redox initiator on emulsion copolymerization of styrene butyl acrylate and comparisoin of paint properties", Sep. 2006, Journal or Scientific & Industrial Research, vol. 65, pp. 744-746.*

(Continued)

*Primary Examiner* — Ling Choi
*Assistant Examiner* — David L Miller
(74) *Attorney, Agent, or Firm* — GE Global Patent Operation

(57) ABSTRACT

The application describes a method of preparing a polymer that includes: mixing in an aqueous solution comprising water and a water-soluble alcohol: a vinyl-based monomer having a sulfonic acid functional group, a bifunctional vinyl-based cross-linking agent, and a polymerization initiator, to form a reaction solution, where the monomer and the cross-linking agent are soluble in the reaction solution; and polymerizing the monomer and cross-linking agent to form the polymer. The application further describes a polymer that includes a polymer backbone comprising sulfonic acid functional groups; and crosslinks comprising alcohol functional groups.

9 Claims, 3 Drawing Sheets

(51) Int. Cl.
*C08F 220/58* (2006.01)
*B01J 47/12* (2006.01)
*C08F 220/38* (2006.01)
*C08J 5/22* (2006.01)
*C08F 228/02* (2006.01)
*C08F 220/26* (2006.01)

(56) References Cited

U.S. PATENT DOCUMENTS

| | | | |
|---|---|---|---|
| 4,360,434 A * | 11/1982 | Kawaguchi et al. | 210/500.28 |
| 4,617,321 A | 10/1986 | MacDonald | |
| 5,145,618 A * | 9/1992 | MacDonald et al. | 264/46.3 |
| 5,335,726 A * | 8/1994 | Rodrigues | 166/295 |
| 6,783,937 B1 * | 8/2004 | Hou et al. | 435/6.12 |
| 7,226,960 B2 * | 6/2007 | Jia | 523/115 |
| 7,435,498 B2 | 10/2008 | Yandrasits et al. | |
| 7,544,278 B2 | 6/2009 | Aminabhavi et al. | |
| 2003/0059657 A1 * | 3/2003 | Stone et al. | 429/30 |
| 2005/0244695 A1 * | 11/2005 | Kiefer et al. | 429/33 |

FOREIGN PATENT DOCUMENTS

| | | |
|---|---|---|
| JP | 2005233905 A | 9/2005 |
| WO | 2011073639 A1 | 6/2011 |

OTHER PUBLICATIONS

Tongwen Xu "Ion Exchange Membranes: State of their development and perspective", Journal of Membrane Science 263 (2005) 1-29.

Gab-Jin Hwang et al. "Ion Exchange Membrane Based on Block Copolymers. Part III: Preparation of Cation Exchange Membrane", Journal of Membrance Science 156 (1999) 61-65.

G.S. Gohil et al. Comparative Studies on Electrochemical Characterization of Homogeneous and Heterogeneous Type of Ion-Exchange Membranes, Journal of Membrance Science 240 (2004) 211-219.

International Search Report and Written Opinion issued in relation to PCT/US2012/053403 dated Jan. 16, 2014.

SEPPIC SA, English language abstract of FR2950060, published Mar. 18, 2011.

Sekisui Chemical Co Ltd, English language abstract of JP2005233905, published Sep. 2, 2005.

Nagarale et al., "Recent developments on ion-exchange membranes and electro-membrane processes", Advances in Colloid and Interface Science, vol. No. 119, pp. 97-130, 2006.

Unofficial English translation of Office Action issued in connection with corresponding CN Application No. 201280044543.2 on Apr. 10, 2015.

* cited by examiner

CATION EXCHANGE MATERIALS PREPARED IN AQUEOUS MEDIA

FIELD

The present disclosure relates generally to cation exchange materials.

BACKGROUND

Preparation of standard cation exchange materials employs non-polymerizable high-boiling solvents for the polymerization of sulfonic acid group containing vinyl monomers and divinyl crosslinkers in the presence of a radical initiator. In several instances, the dissolution of the monomers and crosslinkers in the solvents necessitates high temperature mixing over a long periods of time and use of inhibitors to inhibit the premature polymerization of the monomers during high temperature mix preparation. Also, the post processing of the cation exchange materials involves disposal of as much as 30-35 weight % solvent in hazardous waste streams, increasing the cost of waste disposal.

U.S. Pat. No. 4,617,321, to MacDonald, discloses the preparation of a cation exchange materials where a sulfonic acid group containing vinyl monomer is polymerized with acrylamide and N-methylolacrylamide, using water as a non-polymerizing solvent. MacDonald teaches polymerization of the monomers at 80° C. for 2 hours.

Processes which are known in the art for producing cation exchange membranes involve preparing the cation exchange membranes (and/or precursors) in non-aqueous media, and sulfonation of the membranes to obtain sulfonic acid groups. The costs involved in using these raw materials, as well as the costs in scaling the process to industrial magnitude, add to the cost associated with membrane production process.

INTRODUCTION TO THE INVENTION

It is desirable to provide a lower cost solvent system and/or a more environmentally-friendly solvent system for preparing cation exchange material.

It is desirable to simplify the process for preparing cation exchange materials, for example by using a solvent which can dissolve the monomer(s) (such as AMPS) at a temperature closer to ambient temperature than the temperature required in previously known processes (such as the temperature required when using NMP to dissolve AMPS). It is desirable to use a solvent system which results in reduced amounts of organic solvent in the post preparation waste streams, thereby reducing waste treatment and disposal costs.

It is an object of the present disclosure to obviate or mitigate at least one disadvantage of previous cation exchange materials and methods for their production.

In a first aspect, the present disclosure provides a method of preparing a polymer that includes: mixing in an aqueous solution comprising water and a water-soluble alcohol: an vinyl-based monomer having a sulfonic acid or sulfonate salt functional group, a bifunctional vinyl-based cross-linking agent, and a polymerization initiator, to form a reaction solution, where the monomer and the cross-linking agent are soluble in the reaction solution; and polymerizing the monomer and cross-linking agent to form the polymer.

In some methods, the monomer and cross-linking agents may be mixed in a molar ratio ranging from 0.50:1 to 2.0:1 (monomer:cross-linking agent); the polymerization initiator may be added in a molar ratio ranging from 0.0025:1 to 0.02:1 (mols of polymerization initiator:total mols of monomer and cross-linking agent); and the aqueous solution may include water and the water-soluble alcohol in a weight ratio ranging from 1.0:1 to 3.0:1 (water:water-soluble alcohol).

In particular methods, the monomer and cross-linking agent may total between 50 and 80 wt % of the reaction solution; where the remaining wt % comprises an aqueous solution having a weight ratio of 1.0:1 to 3.0:1 of water:alcohol.

The vinyl-based monomer may be an acrylic-based monomer, a styrene-based monomer or an allyl-based monomer.

The monomer may be 2-acrylamido-2-methylpropane sulfonic acid (AMPS), the cross-linking agent may be glycerol dimethacrylate (GDMA), and the water-soluble alcohol may be 1-propanol.

The method may further include mixing the reaction solution under vacuum.

The method may further include placing the polymer on a backing cloth to form a polymer sheet; drying the polymer sheet; and converting the sulfonic acid groups to sulfonate functional groups to form a sheet of cation exchange membrane. The polymer sheet may be dried at a temperature between 60° C. and 90° C. for between 30 and 120 minutes. A saturated solution of sodium bicarbonate may be used to convert the sulfonic acid groups to sulfonate functional groups. The backing cloth may be selected from the group consisting of acrylic, polypropylene and polyester cloth.

In another aspect, the present disclosure provides a polymer that includes a polymer backbone comprising sulfonic acid functional groups; and crosslinks comprising alcohol functional groups.

The polymer backbone may include a monomeric building block according to Formula I:

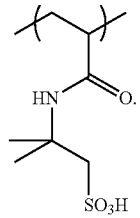

Formula I

The crosslinks may include a cross-linker according to Formula II:

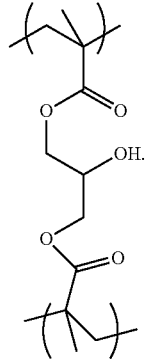

Formula II

Particular polymers contemplated may be according to Formula III:

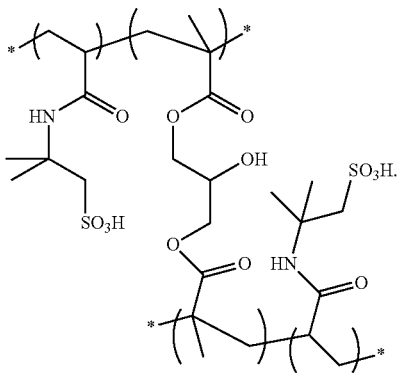

Formula III

Other aspects and features of the present disclosure will become apparent to those ordinarily skilled in the art upon review of the following description of specific examples in conjunction with the accompanying figures.

DETAILED DESCRIPTION

Generally, the present disclosure provides processes for the preparation of cation exchange materials in aqueous media. More particularly, the present disclosure relates to poly(2-acrylamido-2-methylpropane sulfonic acid) crosslinked with glycerol dimethacrylate, prepared in aqueous media.

Figure 2:
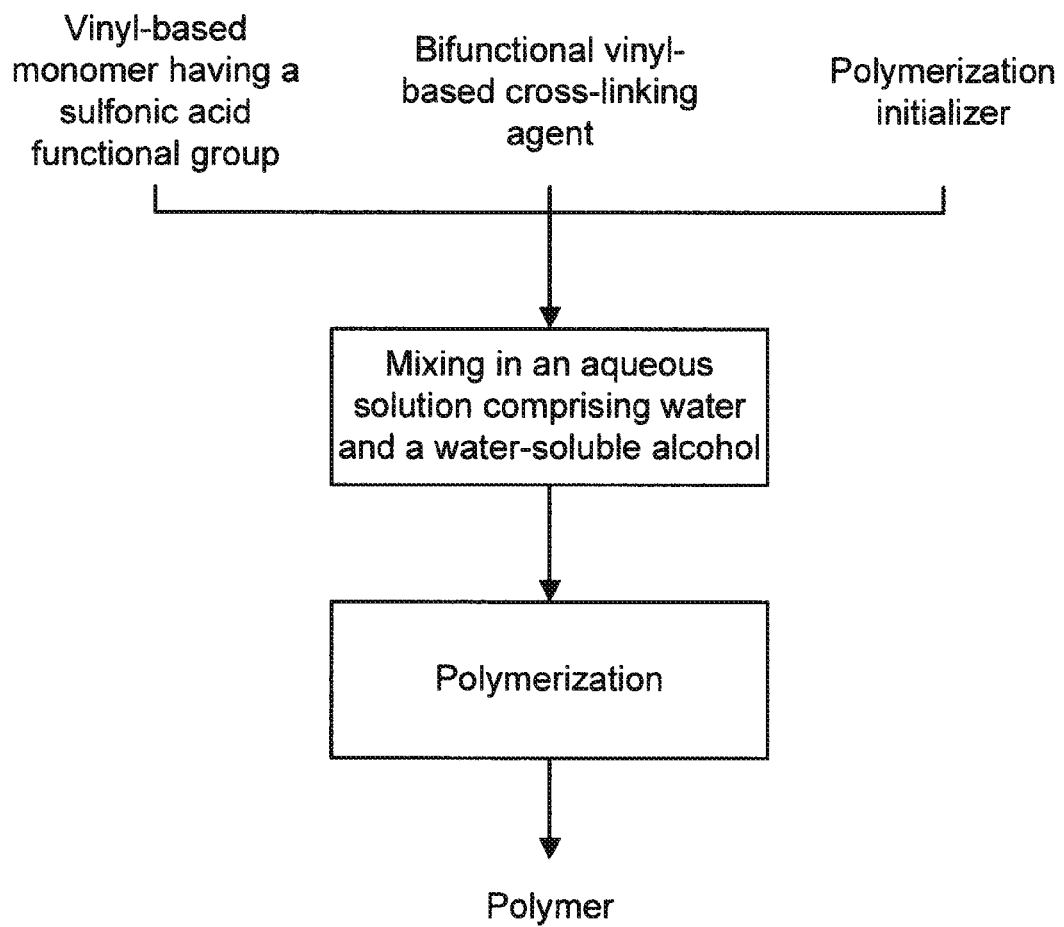
FIG. 2 is a flowchart illustrating the method for synthesizing the cross-linked polymer.

A process for synthesizing the polymers is illustrated by the flowchart of FIG. 2 and involves mixing 50-80 wt % of a mixture of vinyl-based monomer(s) and vinyl-based cross-linking agent(s) in a molar ratio of 0.5:1 to 2.0:1 (monomer(s):cross-linking agent(s)); with the remaining wt % comprising an aqueous solution having a weight ratio of 1.0:1 to 3.0:1 of water:alcohol, where the polymerization initiator may be added in a molar ratio ranging from 0.0025:1 to 0.02:1 (mols of polymerization initiator:total mols of monomer and cross-linking agent).

In various examples, the vinyl-based monomer and vinyl-based cross-linking agent may make up 50-55, 55-60, 60-65, 65-70, 70-75, or 75-80 wt % of the reaction solution. In other examples, the vinyl-based monomer and vinyl-based cross-linking agent may make up 50-60, 60-70, or 70-80 wt % of the reaction solution.

In various examples, the aqueous solution may have a weight ratio of 0.5:1 to 1.0:1, 1.0:1 to 1.5:1, 1.5:1 to 2.0:1, 2.0:1 to 2.5:1, or 2.5:1 to 3.0:1 of water:alcohol. In other examples, the aqueous solution may have a weight ratio of 0.5:1 to 1.5:1, 1.5:1 to 3.0:1 of water:alcohol.

In particular examples, the vinyl-based monomer and vinyl-based cross-linking agent may make up 60-70 wt % of the reaction solution and may be dissolved in an aqueous solution of water and a water-soluble alcohol that makes up the remaining portion of the reaction solution, the aqueous solution having a weight ratio of 1.5:1 to 3.0:1 of water:alcohol and 0.7 to 0.85 wt % of polymerization initiator.

The vinyl-based monomer and vinyl-based cross-linking agent are soluble in the aqueous solution of water and a water-soluble alcohol. The vinyl-based monomer may be an acrylic-based monomer, a styrene-based monomer or an allyl-based monomer. The monomer may be, for example, 2-acrylamido-2-methylpropane sulfonic acid (AMPS), sodium styrene sulfonate, sodium methylallyl sulfonate, sodium vinyl sulfonate, sodium allyl sulfonate, sodium 2-sulfoethyl methacrylate, or sodium 2-sulfobutyl methacrylate. A preferred monomer is AMPS.

The vinyl-based cross-linking agent may be an acrylic-based cross-linking agent, a styrene-based cross-linking agent or an allyl-based cross-linking agent. The vinyl-based cross-linking agent may be, for example, glycerol dimethacrylate (GDMA), N-(acrylamidomethyl)methacrylamide, ethyleneglycol dimethacrylate, glycerol dimethacrylate, poly(ethyleneglycol)dimethacrylate, and methylenebisacrylamide. A preferred vinyl-based cross-linking agent is GDMA.

The water soluble alcohol is a water soluble solvent capable of solubilizing the monomer and cross-linking agent. Preferably, the water soluble alcohol is a high boiling, low cost, low toxicity solvent. In particular embodiments, the water soluble alcohol is propanol, or butanol. In particular embodiments, the water soluble alcohol is 1-propanol.

The polymerization of the monomer and cross-linking agent can be thermally or photochemically initialized using a polymerization initiator which is soluble in the aqueous solvent, for example using 2.2'-Azobis(2-methylpropionamidine)dihydrochloride (commercially known as V-50); 2,2'-Azobis[2-(2-imidazolin-2-yl)propane]dihydrochloride (VA-044); 2,2'-Azobis[2-(2-imidazolin-2-yl)propane]disulfate dehydrate (VA-046B); 2,2'-Azobis[N-(2-carboxyethyl)-2-methylpropionamidine]hydrate (VA-057); 2,2'-Azobis{2-[1-(2-hydroxyethyl)-2-imidazolin-2-yl] propane}dihydrochloride (VA-060); 2,2'-Azobis[2-(2-imidazolin-2-yl)propane] (VA-061); 2,2'-Azobis(1-imino-1-pyrrolidino-2-ethylpropane)dihydrochloride (VA-067); 2,2'-Azobis{2-methyl-N-[1,1-bis(hydroxymethyl)-2-hydroxyethyl]propionamide} (VA-080); or 2,2'-Azobis[2-methyl-N-(2-hydroxyethyl)propionamide] (VA-086). In particular examples, the polymerization initiator may be, for example, 2.2'-Azobis(2-methylpropionamidine)dihydrochloride.

It may be desirable to use polymerization initiators whose initiation temperatures are less than 50° C. in order to facilitate membrane curing under mild conditions. Using initiators that initiate the polymerization/curing at lower temperatures (e.g. 50° C.) may help avoid energy costs involved in curing at higher temperatures.

Chain termination in a polymerization reaction occurs by different mechanisms, such as by recombination of two active polymerization sites or by interaction of an active polymerization site with an inhibitor. If longer chains are desired, the polymerization initiator concentration and polymerization inhibitor concentration should be lower than if shorter chains are desired. Depending on the desired length of polymer, it may be desirable for the polymerization to take place in reaction conditions free of, or substantially free of, polymerization inhibitors, such as oxygen, nitrobenzene, butylated hydroxyl toluene, or diphenyl picryl hydrazyl (DPPH).

Figure 3:
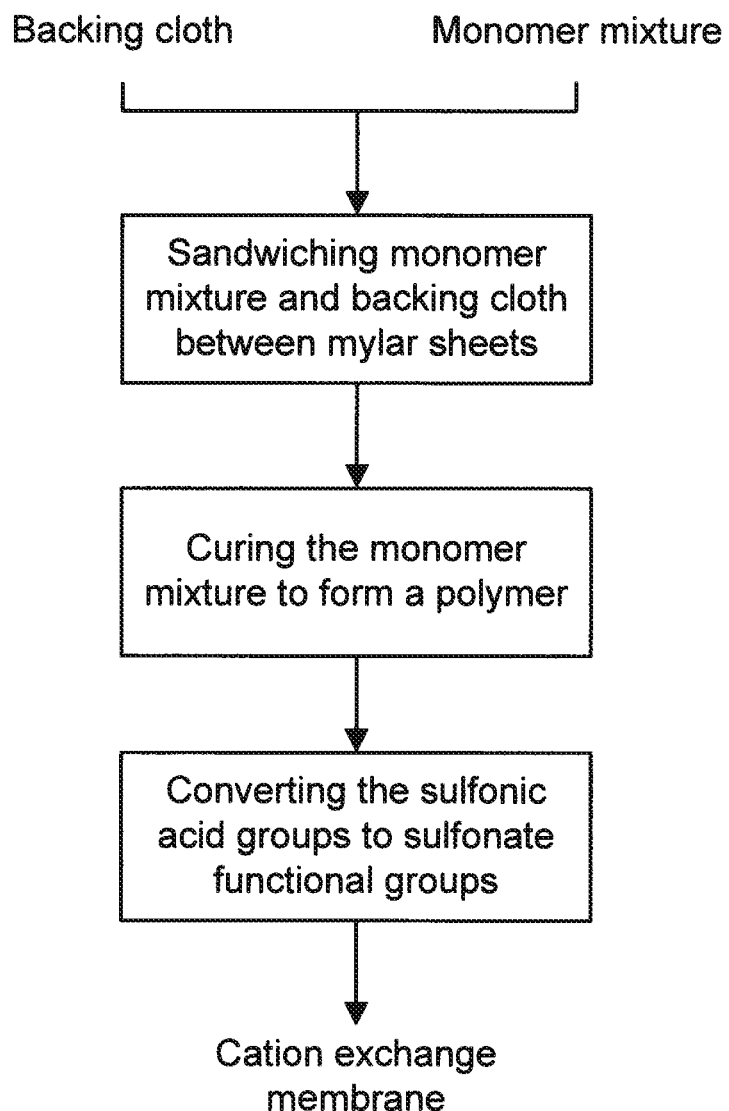
FIG. 3 is a flowchart illustrating the method for producing a cation exchange membrane using the cross-linked polymer.

The produced polymeric material may be used in the production of, for example, cation exchange resin or cation exchange membranes. An exemplary process for the production of cation exchange membranes is illustrated by the flowchart of FIG. 3. In such methods, a mixture of monomer, cross-liking agent and polymerization initiator is used to wet a membrane backing cloth, such as acrylic, polyester or polypropylene. The mixture is sandwiched between glass plates to remove excess reagents and then cured by drying, for example in an oven for 30-120 minutes at a temperature from 60-90° C. It would be understood that curing at lower temperatures (e.g. 60° C.) would required longer curing times when compared to curing at higher temperatures (e.g. 90° C.).

Depending on the monomer used, the cured membranes may be converted into anionic functional groups, for example by treating the membranes in a saturated solution of sodium bicarbonate for a period of time (for example, for 10-20 h depending on the size of the membrane) to convert the sulfonic acid groups to sodium sulfonate functional groups. The membranes may be rinsed, for example with deionized water for 1 day, to obtain the cation exchange membrane.

Figure 1:
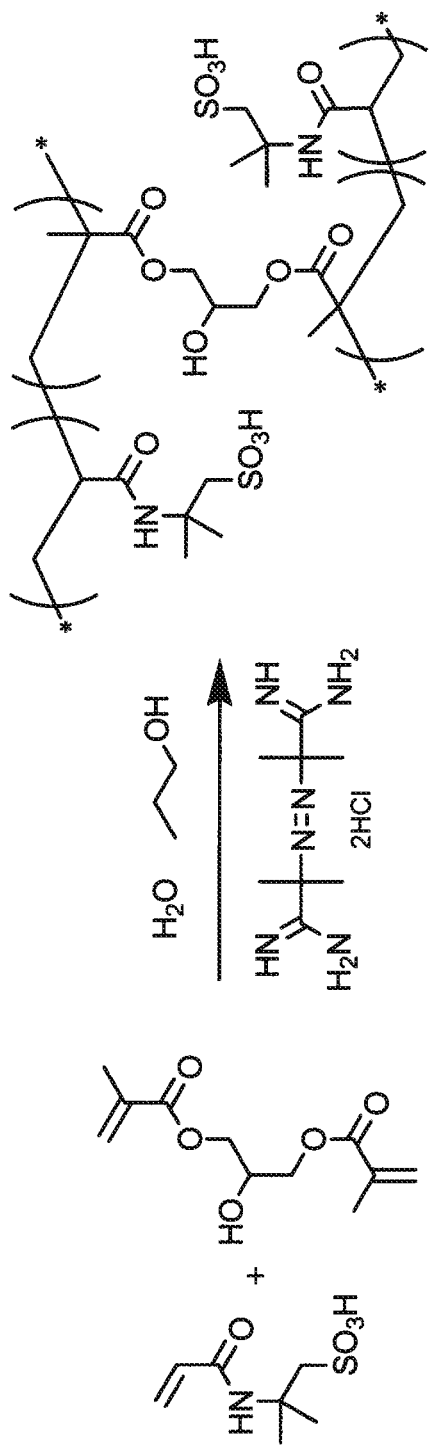
FIG. 1 is an illustration of a polymerization reaction used to form a cross-linked polymer.

In a specific example, a cross-linked polymer is produced from the polymerization of 2-acrylamido-2-methylpropane sulfonic acid (AMPS) and glycerold dimethacrylate (GDMA) in the presence of a water/propanol solution and initiated using 2.2'-Azobis(2-methylpropionamidine)dihydrochloride (V-50), as illustrated in FIG. 1 and exemplified in Examples 1, 3, 5, 7, 9 and 12. The quantities of reagents and solvents used in Examples 1, 3, 5, 7, 9 and 12 are summarized in Table 1, below, and the corresponding wt % of the reagents and solvents, and the molar and weight ratios of AMPS to GDMA, and water to propanol are summarized in Table 2.

and stirred for 15 minutes. The GDMA solution is added slowly to the AMPS solution and the resulting solution is stirred for 15 minutes. Finally, V-50 catalyst (0.73 g) is added to the flask and the solution stirred for another 20 minutes. The solution is transferred to a round bottom flask and degassed under vacuum for 45 minutes.

Example 2

Production of an Exemplary Cation Exchange Membrane

The degassed monomer mixture produced as described in Example 1 is used to wet an acrylic backing cloth. The acrylic cloth (0.44958 mm thick) is placed on a mylar sheet which in turn is placed on a clean glass plate and the monomer solution described in Example 1 is poured on the backing cloth. A second mylar sheet is placed on the wet acrylic backing cloth and excess monomer mixture is drained from the cloth. The two mylar sheets and acylic cloth are sandwiched between glass plates and clamped using binder clips. The sandwiched sheets are cured by heating them in an oven at 85° C. for 40 minutes. The cured sandwiched sheets are cooled for 15 minutes out of the oven and the glass plates are removed. The mylar sheets are separated from the acylic/polymer membrane, which is soaked in a saturated solution of sodium bicarbonate for 10-14 h to convert the sulfonic acid groups of the AMPS to sodium sulfonate functional groups. The mem-

TABLE 1

|  | Mols | | | Weight Percent | | | | |
| --- | --- | --- | --- | --- | --- | --- | --- | --- |
|  | AMPS | GDMA | V-50 | AMPS | GDMA | V-50 | Propanol | Water |
| Ex. 1 | 0.168 | 0.120 | 0.00253 | 34.8% | 27.5% | 0.7% | 13.0% | 24.0% |
| Ex. 3 | 0.161 | 0.124 | 0.00246 | 34.3% | 29.1% | 0.7% | 13.3% | 22.5% |
| Ex. 5 | 0.147 | 0.136 | 0.00246 | 32.1% | 32.5% | 0.7% | 15.7% | 18.9% |
| Ex. 7 | 0.159 | 0.123 | 0.00246 | 34.8% | 29.6% | 0.7% | 13.7% | 21.1% |
| Ex. 9 | 0.159 | 0.123 | 0.00246 | 34.8% | 29.6% | 0.7% | 13.7% | 21.1% |
| Ex. 12 | 0.159 | 0.123 | 0.00295 | 35.9% | 30.5% | 0.9% | 10.9% | 21.8% |

TABLE 2

|  | Mol ratio AMPS:GDMA | wt % AMPS + GDMA | wt % Propanol + water | wt ratio (AMPS:GDMA) | wt ratio (Water:Propanol) |
| --- | --- | --- | --- | --- | --- |
| Ex. 1 | 1.40 | 62.3% | 37.0% | 1.27 | 1.85 |
| Ex. 3 | 1.30 | 63.4% | 35.8% | 1.18 | 1.69 |
| Ex. 5 | 1.09 | 64.6% | 34.6% | 0.99 | 1.20 |
| Ex. 7 | 1.30 | 64.4% | 34.8% | 1.18 | 1.54 |
| Ex. 9 | 1.30 | 64.4% | 34.8% | 1.18 | 1.54 |
| Ex. 12 | 1.30 | 66.4% | 32.6% | 1.18 | 2.00 |

The Examples, below, teach the synthesis of different polymers contemplated by the present application (Examples 1, 3, 5, 7, 9 and 12), and teach different ways to produce cation exchange membranes using the different polymers and report the resulting properties of the membranes (Examples 2, 4, 6, 8, 10, 11 and 13).

Example 1

An Exemplary Mixture of Monomer, Cross-Linking Agent and Polymerization Initiator AMPS (34.8 g) is dissolved in water (24 g) and stirred for 35 minutes. GDMA (27.5 g) is dissolved in 1-propanol (13 g)

brane is rinsed with deionized water for 1 day, or until analysis, to obtain the cation exchange membrane.

The cation exchange membrane produced from the polymerization of AMPS and GDMA is leak proof and stable to various solutions, such as 2 N sodium chloride and 1 N sodium hydroxide, and has a theoretical ion exchange capability of 2.5 mEq/dry gram, water content of 33 wt %.

The cation exchange membrane produced from the copolymerization of AMPS and GDMA has a measured ion exchange capacity of 2.31 meq/dry gm; a water content of 46.7%; a thickness of 0.56 mm, and an area resistance of 10.96 Ohm-cm$^2$.

Example 3

An Exemplary Mixture of Monomer, Cross-Linking Agent and Polymerization Initiator AMPS (33.54 g) is dissolved in water (22 g) and stirred for 35 minutes. GDMA (28.4 g) is dissolved in 1-propanol (13 g) and stirred for 15 minutes. The GDMA solution is added slowly to the AMPS solution and the resulting solution is stirred for 15 minutes. Finally, V-50 catalyst (0.71 g) is added to the flask and the solution stirred for another 20 minutes. The solution is transferred to a round bottom flask and degassed under vacuum for 45 minutes.

Example 4

Production of an Exemplary Cation Exchange Membrane

The degassed monomer mixture produced as described in Example 3 is used to wet an acrylic backing cloth. The acrylic cloth (0.44958 mm thick) is placed on a mylar sheet which in turn is placed on a clean glass plate and the monomer solution described in Example 3 is poured on the backing cloth. A second mylar sheet is placed on the wet acrylic backing cloth and excess monomer mixture is drained from the cloth. The two mylar sheets and acylic cloth are sandwiched between glass plates and clamped using binder clips. The sandwiched sheets are cured by heating them in an oven at 85° C. for 40 minutes. The cured sandwiched sheets are cooled for 15 minutes out of the oven and the glass plates are removed. The mylar sheets are separated from the acylic/polymer membrane, which is soaked in a saturated solution of sodium bicarbonate for 10-14 h to convert the sulfonic acid groups of the AMPS to sodium sulfonate functional groups. The membrane is rinsed with deionized water for 1 day, or until analysis, to obtain the cation exchange membrane.

The cation exchange membrane produced from the polymerization of AMPS and GDMA is leak proof and stable to various solutions, such 2 N sodium chloride and 1 N sodium hydroxide, and has a theoretical ion exchange capability of 2.4 mEq/dry gram, solvent (water+propanol) content of 33 wt %.

Example 5

An Exemplary Mixture of Monomer, Cross-Linking Agent and Polymerization Initiator AMPS (30.6 g) is dissolved in water (18 g) and stirred for 35 minutes. GDMA (30.6 g) is dissolved in 1-propanol (15 g) and stirred for 15 minutes. The GDMA solution is added slowly to the AMPS solution and the resulting solution is stirred for 15 minutes. Finally, V-50 catalyst (0.71 g) is added to the flask and the solution stirred for another 20 minutes. The solution is transferred to a round bottom flask and degassed under vacuum for 45 minutes.

Example 6

Production of an Exemplary Cation Exchange Membrane

The degassed monomer mixture produced as described in Example 5 is used to wet a backing cloth. An acrylic cloth (0.44958 mm thick) is placed on the a mylar sheet which in turn is placed on a clean glass plate and the monomer solution described in Example 5 is poured on the backing cloth. A second mylar sheet is placed on the wet acrylic cloth and excess monomer mixture is drained from the cloth. The two mylar sheets and acylic cloth are sandwiched between glass plates and clamped using binder clips. The sandwiched sheets are cured by heating them in an oven at 85° C. for 35 minutes. The cured sandwiched sheets are cooled for 15 minutes out of the oven and the glass plates are removed. The mylar sheets are separated from the acylic/polymer membrane, which is soaked in a saturated solution of sodium bicarbonate for 10-14 h to convert the sulfonic acid groups of the AMPS to sodium sulfonate functional groups. The membrane is rinsed with deionized water for 1 day, or until analysis, to obtain the cation exchange membrane.

The cation exchange membrane produced from the polymerization of AMPS and GDMA is leak proof and stable to various solutions, such 2 N sodium chloride and 1 N sodium hydroxide, and has a theoretical ion exchange capability of 2.2 mEq/dry gram, solvent (water+propanol) content of 33 wt %.

Example 7

An Exemplary Mixture of Monomer, Cross-Linking Agent and Polymerization Initiator AMPS (33 g) is dissolved in water (20 g) and stirred for 35 minutes. GDMA (28.1 g) is dissolved in 1-propanol (13 g) and stirred for 15 minutes. The GDMA solution is added slowly to the AMPS solution and the resulting solution is stirred for 15 minutes. Finally, V-50 catalyst (0.71 g) is added to the flask and the solution stirred for another 20 minutes. The solution is transferred to a round bottom flask and degassed under vacuum for 45 minutes.

Example 8

Production of an Exemplary Cation Exchange Membrane

The degassed monomer mixture produced as described in Example 7 is used to wet a backing cloth. An acrylic cloth (0.44958 mm thick) is placed on the a mylar sheet which in turn is placed on a clean glass plate and the monomer solution described in Example 7 is poured on the backing cloth. A second mylar sheet is placed on the wet acrylic cloth and excess monomer mixture is drained from the cloth. The two mylar sheets and acylic cloth are sandwiched between glass plates and clamped using binder clips. The sandwiched sheets are cured by heating them in an oven at 85° C. for 35 minutes. The cured sandwiched sheets are cooled for 15 minutes out of the oven and the glass plates are removed. The mylar sheets are separated from the acylic/polymer membrane, which is soaked in a saturated solution of sodium bicarbonate for 10-14 h to convert the sulfonic acid groups of the AMPS to sodium sulfonate functional groups. The membrane is rinsed with deionized water for 1 day, or until analysis, to obtain the cation exchange membrane.

The cation exchange membrane produced from the polymerization of AMPS and GDMA is leak proof and stable to various solutions, such 2 N sodium chloride and 1 N sodium hydroxide, and has a theoretical ion exchange capability of 2.4 mEq/dry gram, solvent (water+propanol) content of 33 wt %.

The cation exchange membrane produced from the polymerization of AMPS and GDMA has a measured ion exchange capacity of 2.06 meq/dry gm, a water content of 41.8%, a thickness of 0.59 mm, and an area resistance of 12.00 Ohm-cm$^2$.

Example 9

An Exemplary Mixture of Monomer, Cross-Linking Agent and Polymerization Initiator AMPS (33 g) is dissolved in water (20 g) at room temperature and stirred for 30 minutes. GDMA (28.5 g) is dissolved in 1-propanol (13 g) and added slowly to the AMPS solution. The resulting solution is stirred for 20 minutes. Finally, V-50 catalyst (0.71 g) is added to the flask and the solution stirred for another 20 minutes. The solution is transferred to a round bottom flask and degassed under vacuum for 45 minutes.

Example 10

Production of an Exemplary Cation Exchange Membrane

The degassed monomer mixture produced as described in Example 9 is used to wet a backing cloth. An acrylic cloth (0.44958 mm thick) is placed on the a mylar sheet which in turn is placed on a clean glass plate and the monomer solution described in Example 9 is poured on the backing cloth. A second mylar sheet is placed on the wet acrylic cloth and excess monomer mixture is drained from the cloth. The two mylar sheets and acylic cloth are sandwiched between glass plates and clamped using binder clips. The sandwiched sheets are cured by heating them in an oven at 85° C. for 40 minutes. The cured sandwiched sheets are cooled for 15 minutes out of the oven and the glass plates are removed. The mylar sheets are separated from the acylic/polymer membrane, which is soaked in a saturated solution of sodium bicarbonate for 10-14 h to convert the sulfonic acid groups of the AMPS to sodium sulfonate functional groups. The membrane is rinsed with deionized water for 1 day, or until analysis, to obtain the cation exchange membrane.

The cation exchange membrane produced from the polymerization of AMPS and GDMA is leak proof and stable to various solutions, such 2 N sodium chloride and 1 N sodium hydroxide, and has a theoretical ion exchange capability of 2.4 mEq/dry gram, solvent (water+propanol) content of 33 wt %.

The cation exchange membrane produced from the polymerization of AMPS and GDMA has a measured ion exchange capacity of 2.25 meq/dry gm, a water content=45.1%, a thickness of 0.56 mm, an area resistance of 10.95 Ohm-cm$^2$.

Example 11

Production of an Exemplary Cation Exchange Membrane

The degassed monomer mixture produced as described in Example 9 is used to wet a backing cloth. An acrylic cloth (0.44958 mm thick) is placed on the a mylar sheet which in turn is placed on a clean glass plate and the monomer solution described in Example 9 is poured on the backing cloth. A second mylar sheet is placed on the wet acrylic cloth and excess monomer mixture is drained from the cloth. The two mylar sheets and acylic cloth are sandwiched between glass plates and clamped using binder clips. The sandwiched sheets are cured by heating them in an oven at 85° C. for 40 minutes. The cured sandwiched sheets are cooled for 15 minutes out of the oven and the glass plates are removed. The mylar sheets are separated from the acylic/polymer membrane, which is soaked in a saturated solution of sodium bicarbonate for 10-14 h to convert the sulfonic acid groups of the AMPS to sodium sulfonate functional groups. The membrane is rinsed with deionized water for 1 day, or until analysis, to obtain the cation exchange membrane.

The cation exchange membrane produced from the polymerization of AMPS and GDMA is leak proof and stable to various solutions, such 2 N sodium chloride and 1 N sodium hydroxide, and has a theoretical ion exchange capability of 2.4 mEq/dry gram, solvent (water+propanol) content of 33 wt %.

The cation exchange membrane produced from the polymerization of AMPS and GDMA has a measured ion exchange capacity of 1.98 meq/dry gm, a water content of 39.2%, a thickness of 0.54 mm, and an area resistance of 16.76 Ohm-cm$^2$.

Example 12

An Exemplary Mixture of Monomer, Cross-Linking Agent and Polymerization Initiator AMPS (33 g) is dissolved in water (20 g) and stirred for 10 minutes. 1-propanol (10 g) is added to the solution, which is stirred for 10 minutes. GDMA (28.1 g) is added to the solution and then stirred for 10 minutes. Finally, V-50 catalyst (0.85 g) is added to the flask and the solution stirred for another 15 minutes. The solution is transferred to a round bottom flask and degassed under vacuum for 30 minutes.

Example 13

Production of an Exemplary Cation Exchange Membrane

The degassed monomer mixture produced as described in Example 12 is used to wet a backing cloth. An acrylic, polypropylene or polyester cloth is placed on a mylar sheet which in turn is placed on a clean glass plate and the monomer solution described in Example 12 is poured on the backing cloth. A second mylar sheet is placed on the acrylic, polypropylene or polyester cloth and excess monomer mixture is drained from the acrylic, polypropylene or polyester cloth. The two mylar sheets and the acrylic, polypropylene or polyester cloth are sandwiched between glass plates and clamped using binder clips. The sandwiched sheets are cured by drying them in an oven at 75° C., 80° C. or 85° C. for 30, 45 or 60 minutes. The cured sandwiched sheets are cooled for 15 minutes out of the oven and the glass plates are removed. The mylar sheets are separated from the resulting polymer membrane, which is soaked in a saturated solution of sodium bicarbonate for 10-14 h to convert the sulfonic acid groups of the AMPS to sodium sulfonate functional groups. The membrane is rinsed with deionized water for 1 day, or until analysis, to obtain the cation exchange membrane.

The cation exchange membranes produced from the polymerization of AMPS and GDMA, as described in Example 12, is leak proof and stable to various solutions, such 2 N sodium chloride and 1 N sodium hydroxide. The produced cation exchange membranes have: ion exchange capabilities of 2.2-2.3 mEq/dry gram, water content of 40-45 wt %, and area resistance of 10-13 Ohm cm$^2$.

Example 14

Experimental Protocol for Determination of Ion Exchange Capacity and Water Content Two membrane strips each of 3"×0.75" dimensions are cut using a die and placed in an Erlenmeyer flask (250 ml). 100 ml of 1N Hydrochloric acid is added to the flask and the flask shaken for 30 minutes. The 1N HCl is then replaced with 100 mL deionized (DI) water and the flask is shaken for 15 minutes. The DI water wash is repeated for 3 times or until the solution pH is 4.0. The membranes are soaked in 1N NaCl solution and shaken for 30 minutes. The strips are removed from the flask and rinsed with DI water into the flask. The excess water on the membrane surface is blotted using adsorbent paper and the wet weight of the membranes is recorded ($W_{wet}$). The membranes are then dried for at least 30 minutes in an oven at 120° C. The membranes are removed from the oven and the dry weight is measured immediately ($W_{dry}$). The 1N NaCl solution from the Erlenmeyer flask is titrated against 0.1N NaOH solution (in a burette) in the presence of phenolphthalein indicator. The initial and final volumes (burette readings) of the 0.1N NaOH solution are recorded as $V_i$ and $V_f$, respectively. The ion exchange capacity and water content of the membranes are then calculated according to the following equations:

IEC(in meq/gm)=[(Titration volume of 0.1N NaOH)× (normality of NaOH)/($W_{dry}$–cloth backing weight)]×1000

Water content(in %)=[($W_{wet}$–$W_{dry}$)/($W_{wet}$–cloth backing weight)]×100

Example 15

Experimental Protocol for Measurement of Thickness and Area-Resistance

A membrane strip is cut into 3"×0.75" dimension and placed into a 100 ml plastic bottle. 80 mL of 1N NaCl is added to the bottle and the bottle shaken for 30 minutes. The solution is discarded and the membranes are washed in 80 mL of deionized (DI) water 3 times. The membranes are then soaked in 0.01N NaCl solution in the bottle and shaken for at least 30 min. The thickness is then measured using a thickness gauge. The resistance is measured by placing the membrane in between two platinum electrodes connected to a conductivity/resistivity meter. The resistance recorded is multiplied by the area of the electrodes to obtain area-resistance.

The above-described examples are intended to be for illustration only. Alterations, modifications and variations can be effected to the particular examples by those of skill in the art without departing from the scope, which is defined solely by the claims appended hereto.

What is claimed is:

1. A method of preparing a cation exchange membrane, the method comprising:
    mixing in an aqueous solution comprising water and a water-soluble alcohol:
        a vinyl-based monomer having a sulfonic acid functional group,
        a divinyl cross-linking agent which is selected from the group consisting of glycerol dimethacrylate, ethyleneglycol dimethacrylate and poly(ethylene glycol) dimethacrylate, and
        a thermally initializable polymerization initiator,
    to form a reaction solution, wherein the monomer and the cross-linking agent are soluble in the reaction solution;
        wherein the monomer and the cross-linking agent are mixed in a molar ratio ranging from 0.5:1 to 2.0:1 (monomer:cross-linking agent);
        the polymerization initiator is added in a molar ratio ranging from 0.0025:1 to 0.02:1 (mols of polymerization initiator:total mols of monomer and cross-linking agent); and
        the aqueous solution comprises water and the water-soluble alcohol in a weight ratio ranging from 1.0:1 to 3.0:1 (water:water-soluble alcohol);
    placing the reaction solution on a backing cloth;
    polymerizing the monomer and cross-linking agent to form a polymer sheet; and
    converting the sulfonic acid group to a sulfonate functional group for forming the cation exchange membrane.

2. The method according to claim 1, wherein the reaction solution comprises:
    the vinyl based monomer having a sulfonic acid functional group and the cross-linking agent total between 50 and 80 wt % of the reaction solution; and
    the aqueous solution and the thermally initializable polymerization initiator makes up the remaining wt % of the reaction solution.

3. The method according to claim 1, wherein the vinyl-based monomer having a sulfonic acid functional group is 2-acrylamido-2-methylpropane sulfonic acid (AMPS), the cross-linking agent is glycerol dimethacrylate (GDMA), and the water-soluble alcohol is 1-propanol.

4. The method according to claim 1, further comprising mixing the reaction solution under vacuum.

5. The method according to claim 1, wherein the step of polymerizing occurs at a temperature between 60° C. and 90° C. for between 30 and 120 minutes.

6. The method according to claim 1, wherein a saturated solution of sodium bicarbonate is used to convert the sulfonic acid groups to sulfonate functional groups.

7. The method according to claim 1, wherein the backing cloth is selected from the group consisting of acrylic, polypropylene and polyester cloth.

8. The method according to claim 1 wherein the crosslinking agent is glycerol dimethacrylate (GDMA).

9. The method according to claim 1, wherein the vinyl based monomer having a sulfonic acid functional group is 2-acrylamido-2-2-methylpropane sulfonic acid (AMPS), and the cross-linking agent is glycerol dimethacrylate (GDMA).

* * * * *